(12) United States Patent
Kee

(10) Patent No.: US 6,975,854 B1
(45) Date of Patent: Dec. 13, 2005

(54) BACKUP METHOD FOR USER DATA IN MOBILE TERMINAL

(75) Inventor: Jang Seo Kee, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 766 days.

(21) Appl. No.: 09/656,025

(22) Filed: Sep. 6, 2000

(30) Foreign Application Priority Data

Sep. 8, 1999 (KR) .............................. 1999-38115

(51) Int. Cl.[7] .............................................. H04M 3/42
(52) U.S. Cl. .............................. 455/414.1; 455/412.1; 455/550.1; 455/560
(58) Field of Search ................................. 455/418, 419, 455/411, 423, 425, 560, 561, 565, 575; 340/7.39, 340/7.41

(56) References Cited

U.S. PATENT DOCUMENTS

| | | | | |
|---|---|---|---|---|
| 5,524,276 A | * | 6/1996 | Littig et al. | 455/418 |
| 5,875,405 A | | 2/1999 | Honda | 455/564 |
| 5,894,596 A | * | 4/1999 | Hayes, Jr. | 455/418 |
| 6,041,229 A | * | 3/2000 | Turner | 455/420 |
| 6,064,880 A | * | 5/2000 | Alanara | 455/419 |
| 6,157,844 A | * | 12/2000 | Doran et al. | 455/552.1 |
| 6,173,159 B1 | * | 1/2001 | Wright et al. | 455/66.1 |
| 6,330,434 B1 | * | 12/2001 | Nitta | 455/403 |
| 6,597,772 B1 | * | 7/2003 | Flemming, III | 379/93.25 |

\* cited by examiner

Primary Examiner—Temica Beamer
(74) Attorney, Agent, or Firm—Fleshner & Kim, LLP

(57) ABSTRACT

A backup method for user data in a mobile terminal is disclosed, in which user data stored in a previous mobile terminal can be used in a new mobile terminal when exchanging a mobile terminal with a new one. The backup method for user data in a mobile terminal includes the steps of transmitting the user data of the first mobile terminal to a base station to be stored in the base station, and (b) downloading the user data stored in the base station to the second mobile terminal.

43 Claims, 2 Drawing Sheets

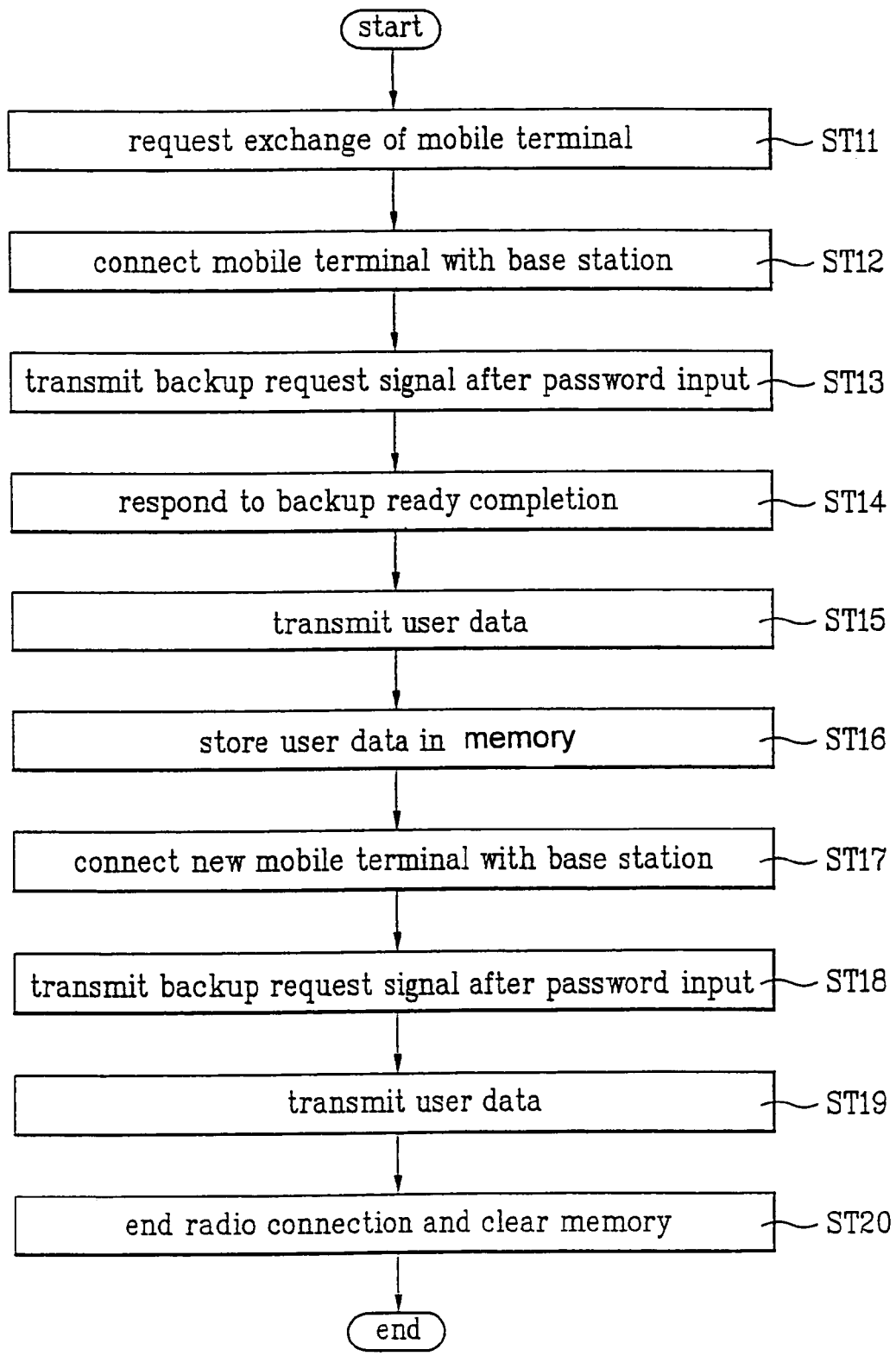

BACKUP METHOD FOR USER DATA IN MOBILE TERMINAL

BACKGROUND OF THE INVENTION

1. Field of the Invention

The present invention relates to a backup method for user data in a mobile terminal, and more particularly, to a backup method for user data in a mobile terminal, in which user data stored in a previous mobile terminal can be used in a new mobile terminal when exchanging a mobile terminal with a new one.

2. Discussion of the Related Art

FIG. 1 is a block diagram of a general mobile communication system.

As shown in FIG. 1, the mobile communication system includes a network operating portion 1, a base station controller 2, base stations 3, and mobile terminals 4. The network operating portion 1 reflects the input from an operator in systems within a network. The base station controller 2 collects data of the network operating portion 1 and of lower base stations 3 and transmits the collected data to a mobile switching center. The base stations 3 transmit data of the base station controller 2 to the user terminals 4 and collect data of the user terminals 4 to transmit them to the base station controller 2. The mobile terminals 4 transmit data transmitted from the base stations 3 to users through a cable and convert data transmitted through the cable, such as voice data and symbol data, to radio data. Then, the mobile terminals 4 transmit the converted data to the base stations 3.

In the aforementioned mobile communication system, examples of the mobile terminal 4 include a personal communication service (PCS) terminal and a cellular communication terminal. Such terminals trend to providing users with more various functions. In other words, the mobile terminal includes a speed dial or quick dial function, a phone book function, and a speech recognition function, in which frequently used phone numbers are stored in a memory. The speed dial or quick dial function allows the user to dial a desired phone number by one touch or two touches of a key. The phone book function allows the user to store frequently used phone numbers and names in a memory and to search for a desired name or phone number so that the user can dial it. The speech recognition function allows the user to store voice data and its corresponding phone number in a memory so that the user can automatically dial a desired phone number by speaking stored voice corresponding to the desired phone number.

To provide the above functions, the mobile terminal is provided with a memory. That is to say, as an example of the memory for providing the functions in the mobile terminal, a programmable EEPROM or flash ROM is used. The memory has a provider data area, a phone book area, a quick dial area, and a speech recognition area.

The provider data area is used by a mobile communication terminal provider when producing the mobile terminal. The other areas are used by the user. The user stores required data in the memory available for the user to use selectively the data at its request. Such data stored in the areas available for the user is called user data.

Meanwhile, FIG. 2 is a block diagram of a mobile terminal and a computer for upgrading software. The mobile terminal 11 is provided with a connector 12, and the computer 13 is provided with a connector 14. A cable 15 mutually connects the connectors 12 and 14.

Accordingly, if a consumer purchased a mobile terminal desires to upgrade its software, a new software is put in the computer 13 and the computer 13 is connected with the mobile terminal 11 by the cable 15. Then, a corresponding software is downloaded from the computer 13 to the mobile terminal 11 so as to upgrade software of the mobile terminal 11.

Furthermore, user data are downloaded from a previously used mobile terminal to the computer and then the user data can be stored in a newly purchased mobile terminal.

However, the mobile terminal of the general mobile communication system has several problems.

When a user exchanges a mobile terminal with a new one due to disorder of the mobile terminal and the like, to use data stored in the data area of the previous mobile terminal in the new mobile terminal, the user must input data in the new mobile terminal referring to the data stored in the previous mobile terminal. It requires much time because the data must be input with the key matrix of the mobile terminal having the number of keys smaller than the number of general key boards. Furthermore, for backup of data by connecting the mobile terminal with the computer by the cable, computer and dedicated cable for backup are required, thereby increasing the equipment cost. Moreover, the mobile terminal should be provided with a separate dedicated circuit such as a series port to connect the mobile terminal with the computer. This increases the cost of the mobile terminal, and thus could lead to lowering of product competitiveness under the price competition of the mobile terminal is intense.

SUMMARY OF THE INVENTION

Accordingly, the present invention is directed to a backup method for user data in a mobile terminal, that substantially obviates one or more of the problems due to limitations and disadvantages of the related art.

An object of the present invention is to provide to a backup method for user data in a mobile terminal, in which user data stored in a previous mobile terminal can be used in a new mobile terminal when exchanging a mobile terminal with a new one.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, in a backup method for user data stored in a first mobile terminal to a second mobile terminal, the method includes the steps of (a) transmitting the user data of the first mobile terminal to a base station to be stored in the base station, and (b) downloading the user data stored in the base station to the second mobile terminal.

In one embodiment of the present invention, the step (a) includes the steps of transmitting a backup request signal from the first mobile terminal to the base station by radio-connecting the first mobile terminal with the base station, transmitting a response signal from the base station to the first mobile terminal in response to the backup request signal, transmitting the user data from the first mobile terminal to the base station if the response signal is identified, and storing the user data in the base station.

In another embodiment of the present invention, the step (a) further includes the step of ending radio connection between the base station and the first mobile terminal after transmitting/receiving mutual complete commander if the base station receives the user data from the first mobile terminal and stores them therein.

In other embodiment of the present invention, the backup request signal is transmitted to the base station only if the backup request signal is input to the first mobile terminal by inputting a password related to maintenance.

In still another embodiment of the present invention, the user data are transmitted to the base station together with a phone number of the first mobile terminal and then stored in the base station using the phone number as an address.

In further another embodiment of the present invention, the step (b) includes the steps of transmitting a download request signal from the second mobile terminal to the base station by connecting the second mobile terminal with the base station, transmitting the user data which received the download request signal, from the base station to the second mobile terminal, and storing the user data in the second mobile terminal.

In still other embodiment of the present invention, the step (b) further includes the steps of ending connection between the base station and the second mobile terminal after transmitting/receiving mutual complete commander if the second mobile terminal receives the user data from the base station and stores them therein, and clearing the user data transmitted from the base station to the second mobile terminal if connection between the base station and the second mobile terminal is ended.

In further other embodiment of the present invention, the download request signal is transmitted to the base station only if the download request signal is input to the second mobile terminal together with a password related to maintenance.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIG. 4 is a flow chart illustrating a backup method for user data in a mobile terminal according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
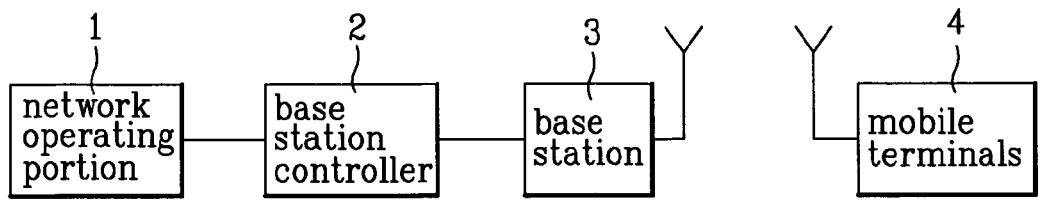
FIG. 1 is a block diagram of a general mobile communication system.
Figure 2:
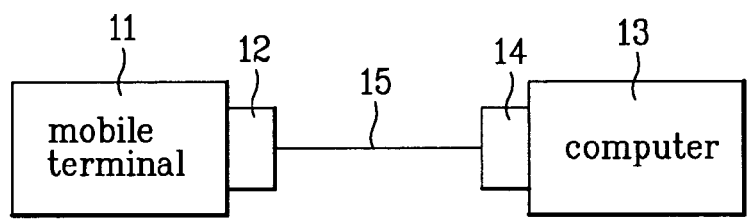
FIG. 2 is a block diagram of a mobile terminal and a computer for upgrading software.
Figure 3:
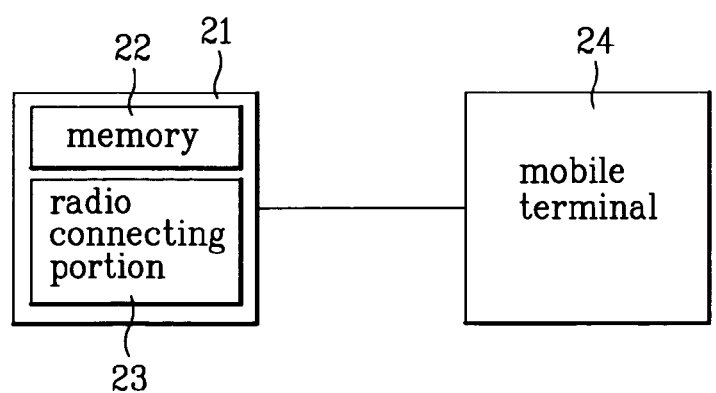
FIG. 3 is a block diagram illustrating a backup method for user data in a mobile terminal according to the present invention.

FIG. 3 is a block diagram of a base station and a mobile terminal, for illustrating a backup method for user data in a mobile terminal according to the present invention.

As shown in FIG. 3, a radio switching center (base station) 21 includes a memory 22 for storing user data of a mobile terminal 24, and a radio connecting portion 23 for radio-connecting to the mobile terminal 24.

A backup method for user data in a mobile terminal according to the present invention will be described with reference to FIG. 4.

To more clearly describe the backup method for user data in the mobile terminal according to the present invention, a previously used terminal is referred to as "first mobile terminal", and a new mobile terminal is referred to as "second mobile terminal".

As shown in FIG. 4, in step ST11, when a user desires to exchange a mobile terminal with a new model as a case of the mobile terminal is partially damaged or defected due to the user's fault, the first mobile terminal is connected with the base station by a radio line in step ST12.

If the first mobile terminal is connected with the base station, a password related to maintenance is input in the first mobile terminal and a "backup request" signal is transmitted from the first mobile terminal to the base station in step ST13.

At this time, the password is input because some error may occur when the other person other than a maintenance engineer uses the backup request. Also, since a plurality of first mobile terminals may request backup, the backup request signal is transmitted using a phone number of the first mobile terminal as an address.

As aforementioned, if the backup request signal is transmitted from the first mobile terminal to the base station, the base station transmits a response signal to the first mobile terminal in step ST14.

If the response signal is identified, the first mobile terminal transmits user data to the base station by a prescribed method in step ST15. The base station stores the user data in the memory 22, and ends radio connection between the first mobile terminal and the base station after transmitting/receiving mutual complete command in step ST16.

When the base station stores the user data, the base station uses the phone number of the first mobile terminal as an address. Accordingly, the user data can be identified even if the plurality of the first mobile terminals simultaneously request the backup request signal.

Subsequently, the second mobile terminal is connected with the base station by a radio line in step ST17. If the second mobile terminal is connected with the base station, a password related to maintenance is input in the second mobile terminal and a "download request" signal is transmitted from the second mobile terminal to the base station in step ST18.

At this time, the password is input because some error may occur when the other person other than a maintenance engineer uses the backup request. Also, desired user data is designated using a phone number stored in the base station.

As aforementioned, if the download request signal is transmitted from the second mobile terminal to the base station, the base station transmits a response signal to the second mobile terminal.

If the response signal is identified, the second mobile terminal is ready to receive the user data from the base station and the base station transmits the user data stored in the memory to the second mobile terminal in step ST19.

The second mobile terminal downloads the user data received from the base station and then stores the user data in the memory. Then, radio connection between the second mobile terminal and the base station is ended after transmitting/receiving mutual complete command. The base station clears corresponding data stored in the memory to respond to additional request of the other users in step ST20.

Therefore, backup of desired user data is possible even if the phone number designated in the first mobile terminal is equal to or different from the phone number designated in the second mobile terminal.

That is to say, when exchanging a mobile terminal with a new one, there may exist a user who desires to use the previously used phone number or a user who desires to use a new phone number. However, regardless of the phone number, desired user data can be used in the new mobile terminal.

As described above, since the user data is downloaded from the previously used mobile terminal to the new mobile terminal when exchanging the mobile terminal, the same user data can be used in the new mobile terminal.

In the above embodiment of the present invention, it has been described that when the user data is downloaded to the second mobile terminal, the base station clears the corresponding user data. However, the user data may be stored for a certain time period. Thus, in even case where the user loses a mobile terminal and purchases a new one, corresponding user data can be downloaded to the new mobile terminal using the phone number of the lost mobile terminal as an address.

As aforementioned, the backup method for user data in a mobile terminal according to the present invention has the following advantages.

Recently provided mobile terminals have various dial functions such as "call by name" function, and also require more various functions. Accordingly, the mobile terminal requires a memory area for user data therein. In the present invention, when exchanging a mobile terminal with a new one, user data can automatically be downloaded to a new terminal without separate equipments, such as a computer and a cable, and additional cost. This could provide satisfactory services to customers and save the cost of the mobile terminal. Furthermore, since the user data are downloaded from the base station to the new mobile terminal after the user data are stored in the base station, backup of the user data is easily possible even if the user loses a mobile terminal and then purchases a new one.

The foregoing embodiments are merely exemplary and are not to be construed as limiting the present invention. The present teachings can be readily applied to other types of apparatuses.

The description of the present invention is intended to be illustrative, and not to limit the scope of the claims. Many alternatives, modifications, and variations will be apparent to those skilled in the art.

What is claimed is:

1. A method for backing up user data in a communication system, comprising:
   (a) transmitting user data of a first mobile terminal for storage in a base station;
   (b) transmitting a phone number of the first mobile terminal to the base station with the user data;
   (c) storing the user data in the base station using the transmitted phone number as an address; and
   (d) downloading the user data stored in the base station to a second mobile terminal.

2. The method of claim 1, wherein step (a) includes:
   transmitting a backup request signal from the first mobile terminal to the base station;
   transmitting a response signal from the base station to the first mobile terminal in response to the backup request signal;
   transmitting the user data from the first mobile terminal to the base station if the response signal is identified; and
   storing the user data in the base station.

3. The method of claim 2, wherein step (a) includes:
   automatically ending radio connection between the base station and the first mobile terminal after transmitting/receiving mutual complete commands if the base station receives the user data from the first mobile terminal and stores them therein.

4. The method of claim 2, wherein the backup request signal is transmitted to the base station only if the backup request signal is input to the first mobile terminal by inputting a password related to maintenance.

5. The method of claim 1, wherein step (d) includes:
   transmitting a download request signal from the second mobile terminal to the base station;
   transmitting the user data corresponding to the download request signal, from the base station to the second mobile terminal; and
   storing the user data in the second mobile terminal.

6. The method of claim 5, wherein step (d) further includes:
   automatically ending connection between the base station and the second mobile terminal after transmitting/receiving mutual complete commands if the second mobile terminal receives and stores the user data from the base station.

7. The method of claim 6, wherein step (d) further includes:
   clearing the user data transmitted from the base station to the second mobile terminal if connection between the base station and the second mobile terminal is ended.

8. The method of claim 5, wherein the download request signal is transmitted to the base station only if the download request signal is input to the second mobile terminal together with a password related to maintenance.

9. The method of claim 5, wherein the user data are downloaded using a phone number corresponding to the user data to be downloaded as an address.

10. A backup method for user data in a mobile terminal comprising:
    transmitting a backup request signal for user data of a first mobile terminal to a base station;
    transmitting a response signal from the base station to the first mobile terminal in response to the backup request signal;
    transmitting the user data from the first mobile terminal to the base station if the response signal is identified;
    transmitting a phone number of the first mobile terminal to the base station with the user data;
    storing the user data in the base station using the transmitted phone number as an address;
    transmitting a download request signal for the user data stored in the base station from a second mobile terminal to the base station; and
    downloading the user data from the base station to the second mobile terminal.

11. The method of claim 10, further comprising the step of ending radio connection between the base station and the first mobile terminal after transmitting/receiving mutual complete commander if the base station receives the user data from the first mobile terminal and stores them therein.

12. The method of claim 10, wherein the backup request signal is transmitted to the base station only if the backup request signal is input to the first mobile terminal by inputting a password related to maintenance.

13. The method of claim 10, wherein the user data are transmitted to the base station together with a phone number of the first mobile terminal and then stored in the base station using the phone number as an address.

14. The method of claim 10, further comprising the step of ending connection between the base station and the second mobile terminal after transmitting/receiving mutual complete commander if the second mobile terminal downloads the user data from the base station.

15. The method of claim 14, further comprising the step of clearing the user data transmitted from the base station to the second mobile terminal if connection between the base station and the second mobile terminal is ended.

16. The method of claim 10, wherein the download request signal is transmitted to the base station only if the download request signal is input to the second mobile terminal together with a password related to maintenance.

17. The method of claim 10, wherein the user data are downloaded using a phone number corresponding to the user data to be downloaded as an address.

18. The method of claim 1, wherein step (d) includes:
transmitting a phone number of the first mobile terminal from the second mobile terminal to the base station; and
accessing the user data stored in the base station based on the transmitted phone number.

19. A method for backing up user data in a communication system, comprising:
receiving, in a base station, a phone number of a first mobile terminal transmitted from a second mobile terminal;
accessing user data stored in the base station for the first mobile terminal based on the transmitted phone number; and
transmitting the user data for storage to the second mobile terminal.

20. The method of claim 19, further comprising:
clearing user data transmitted from the base station to the second mobile terminal when connection between the base station and second mobile terminal ends.

21. The method of claim 19, wherein the phone number of the first mobile terminal is not the phone number of the second mobile terminal.

22. The method of claim 19, further comprising:
receiving a password from the second mobile terminal; and
performing said accessing step only if the password is valid.

23. The method of claim 22, wherein the password is a maintenance password established for the first mobile terminal.

24. The method of claim 19, wherein the user data includes phone book information.

25. The method of claim 19, wherein the user data includes speed-dial or quick-dial information.

26. The method of claim 19, wherein the user data includes speech-recognition information.

27. The method of claim 26, wherein the speech-recognition information is associated with a phone number of at least one user in a phone book stored in the first mobile terminal.

28. The method of claim 19, further comprising:
automatically clearing the user data from the base station after the user data is transmitted to the second mobile terminal.

29. A method for managing user data in a communication system, comprising:
transmitting user data of a first mobile terminal to a base station;
transmitting a phone number of the first mobile terminal to the base station and using the transmitted phone number as an address for the user data; and
receiving acknowledgment from the base station that the user data has been received.

30. The method of claim 29, further comprising:
transmitting a password to the base station prior to transmitting the user data and phone number.

31. The method of claim 30, wherein the password is a maintenance password established for the first mobile terminal.

32. The method of claim 29, wherein the user data includes phone book information.

33. The method of claim 29, wherein the user data includes speed-dial or quick-dial information.

34. The method of claim 29, wherein the user data includes speech-recognition information.

35. The method of claim 29, wherein the speech-recognition information is associated with a phone number of at least one user in a phone book stored in the first mobile terminal.

36. The method of claim 29, further comprising:
automatically ending connection between the first mobile terminal and base station upon receiving said acknowledgment.

37. A method for managing user data in a communication system, comprising:
transmitting a phone number of a first mobile terminal from a second mobile terminal to a base station; and
receiving, in the second mobile terminal, user data of the first mobile terminal from the base station based on the phone number of the first mobile terminal.

38. The method of claim 37, further comprising:
transmitting a password from the second mobile terminal to the base station prior to transmitting the phone number.

39. The method of claim 38, wherein the password is a maintenance password established for the first mobile terminal.

40. The method of claim 37, further comprising:
automatically ending connection between the second mobile terminal and the base station after receiving the user data.

41. The method of claim 37, wherein the user data includes speed-dial or quick-dial information.

42. The method of claim 37, wherein the user data includes speech-recognition information.

43. The method of claim 37, wherein the speech-recognition information is associated with a phone number of at least one user in a phone book stored in the first mobile terminal.

* * * * *